(12) United States Patent
Huang et al.

(10) Patent No.: US 10,996,867 B2
(45) Date of Patent: *May 4, 2021

(54) MANAGING PARTIAL SUPERBLOCKS IN A NAND DEVICE

(71) Applicant: Micron Technology, Inc., Boise, ID (US)

(72) Inventors: Jianmin Huang, San Carlos, CA (US); Kulachet Tanpairoj, Santa Clara, CA (US); Harish Reddy Singidi, Fremont, CA (US); Ting Luo, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,372

(22) Filed: Jul. 9, 2019

(65) Prior Publication Data

US 2020/0042201 A1 Feb. 6, 2020

Related U.S. Application Data

(63) Continuation of application No. 15/858,383, filed on Dec. 29, 2017, now Pat. No. 10,372,355.

(51) Int. Cl.
*G06F 3/06* (2006.01)
*G06F 12/02* (2006.01)
(Continued)

(52) U.S. Cl.
CPC ............ *G06F 3/0619* (2013.01); *G06F 3/065* (2013.01); *G06F 3/0631* (2013.01);
(Continued)

(58) Field of Classification Search
CPC ...... G06F 3/0619; G06F 3/0688; G06F 3/065; G06F 3/0631; G06F 3/0652;
(Continued)

(56) References Cited

U.S. PATENT DOCUMENTS 10,372,355 B2 8/2019 Huang et al.
2010/0228940 A1 9/2010 Asnaashari et al.
(Continued)

FOREIGN PATENT DOCUMENTS

WO WO-2019133198 A1 7/2019

OTHER PUBLICATIONS

U.S. Appl. No. 15/858,383 U.S. Pat. No. 10,372,355, filed Dec. 29, 2017, Managing Partial Superblocks in a NAND Device.
(Continued)

*Primary Examiner* — Kalpit Parikh (74) *Attorney, Agent, or Firm* — Schwegman Lundberg & Woessner, P.A.

(57) ABSTRACT

Devices and techniques for managing partial superblocks in a NAND device are described herein. A set of superblock candidates is calculated. Here, a superblock may have a set of blocks that share a same position in each plane in each die of a NAND array of the NAND device. A set of partial super block candidates is also calculated. A partial superblock candidate is a superblock candidate that has at least one plane that has a bad block. A partial superblock use classification may then be obtained. Superblocks may be established for the NAND device by using members of the set of superblock candidates after removing the set of partial superblock candidates from the set of superblock candidates. Partial superblocks may then be established for classes of data in the NAND device according to the partial superblock use classification.

21 Claims, 6 Drawing Sheets

(51) Int. Cl.
  *G06F 12/1009* (2016.01)
  *G06F 12/1027* (2016.01)

(52) U.S. Cl.
  CPC ........ *G06F 3/0688* (2013.01); *G06F 12/0246* (2013.01); *G06F 12/1009* (2013.01); *G06F 12/1027* (2013.01); *G06F 3/0652* (2013.01); *G06F 2212/68* (2013.01); *G06F 2212/7201* (2013.01)

(58) Field of Classification Search
  CPC ............. G06F 12/0246; G06F 12/1009; G06F 12/1027; G06F 2212/7201; G06F 2212/68
  See application file for complete search history.

(56) References Cited

U.S. PATENT DOCUMENTS

| | | |
|---|---|---|
| 2013/0042054 A1 | 2/2013 | Jung et al. |
| 2013/0336059 A1 | 12/2013 | Lee et al. |
| 2014/0006847 A1* | 1/2014 | Guo .................... G06F 11/1068 714/6.1 |
| 2015/0003156 A1* | 1/2015 | Berckmann ............ G11C 29/04 365/185.09 |
| 2015/0187442 A1 | 7/2015 | Sivasankaran et al. |
| 2017/0031751 A1 | 2/2017 | Baek et al. |
| 2017/0286286 A1 | 10/2017 | Szubbocsev |
| 2017/0315909 A1 | 11/2017 | Yang et al. |
| 2019/0205043 A1 | 7/2019 | Huang et al. |

OTHER PUBLICATIONS

"International Application Serial No. PCT/US2018/063768, International Search Report dated Mar. 19, 2019", 3 pgs.

"International Application Serial No. PCT/US2018/063768, Written Opinion dated Mar. 19, 2019", 7 pgs.

* cited by examiner

MANAGING PARTIAL SUPERBLOCKS IN A NAND DEVICE

PRIORITY APPLICATION

This application is a continuation of U.S. application Ser. No. 15/858,383, filed Dec. 29, 2017, which is incorporated herein by reference.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM) dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Although NAND devices permit write and read addressing at a page level and erasure addressing at a block level there are some practical difficulties in such fine grained resolution. These difficulties can include addressing overhead for a variety of tasks and operations, including maintenance of flash translation layer (FTL) tables. To address these issues, blocks have been aggregated into a single logical entity to which data is written. These aggregated blocks are often called superblocks. Traditionally, superblocks include a block from every plane in every die of a NAND array. This arrangement provides some benefits, such as parallel execution of a write command across die.

Superblocks enable tracking fewer storage units, relieving pressure on FTL tables and management. This can be important in resource limited devices, such as managed NAND, where available working memory (e.g., random access memory (RAM) holding system state) is limited. Thus, using superblocks as a basic operational unit in the NAND device provides efficient resource management while permitting more efficient maintenance operations (e.g., reduced latency and time to perform the operations) and effective device OP.

As noted above, traditional superblocks use a block from each plane of a die and each die in a device. A disadvantage of this construction occurs when a block in a plane of any die is inoperative. In these circumstances, a traditional superblock is not formed and the remaining blocks that would have made up the superblock will not be used in forming superblocks. This reduces the number of superblocks that can be formed. To address this problem, partial superblocks can be used. A partial superblock removes a plane across die (e.g., the partial superblock is less one or more planes than a complete superblock) when one of that plane has a bad block. Because performance impacts can occur when a read or write to a partial superblock involves less data per operation, the partial superblocks can be used for specific data applications in the NAND device to mitigate these performance impacts. This enables greater utilization of blocks throughout the NAND device while maintaining high standards of performance.

Partial superblocks provide benefits to NAND devices in a number of ways. For example NAND design benefits by reducing costs via small die sizes, which can lead to more bad blocks, sometimes to the point of dropping below an end-of-life (EOL) limit. However, with partial superblocks, as long as other planes have fewer failures, dies can be treated as good. Fewer good blocks per plane for acceptable die result in the need for fewer redundant blocks or planes being designed into the NAND devices. Thus, fewer total block counts and smaller die sizes reduce the cost per die of NAND devices. This effect also results in higher manufacturing yields as a single plane failure will not result in a die failure. Moreover, over provisioning (OP) can be improved, resulting in lower write amplification (WA), improve performance, and device endurance. Additional examples and details are described below.

Figure 1:
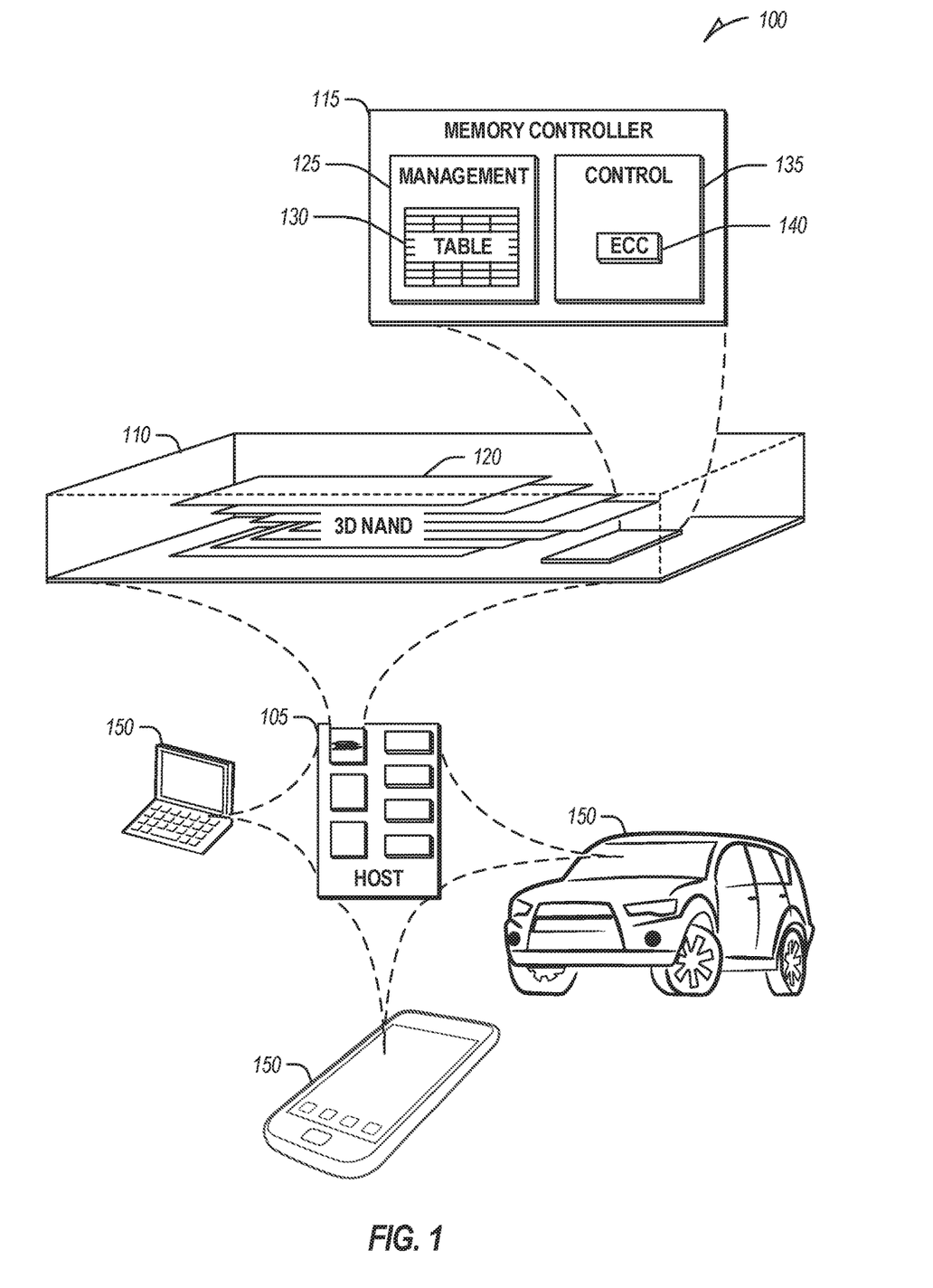
FIG. 1 illustrates an example of an environment including a memory device, according to an embodiment.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 600 of FIG. 6.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110.

The memory controller 115 can implement a flash translation layer (FTL) using superblocks. In general, a superblock comprises a set of blocks in a same position across all planes of a die, and across all die of the memory array 120. Thus, in an example, a superblock is all of the first blocks in all planes of each die, and in another example, all of the second blocks in all planes of each die. The blocks for a superblock have the same intra-die index across die. For example, if a superblock has block zero in die zero, it also has block zero in die one, in die two, and in die three, etc.

To implement partial superblocks, the memory controller 115 is arranged to calculate a set of superblock candidates. As noted above, a superblock comprises a set of blocks that share a same position in each plane in each die of a memory array 120. Here, each plane has at most one block from the set of blocks. In an example, the memory controller 115 calculates the set of superblock candidates when firmware is downloaded to the memory device 110. In an example, the memory controller 115 calculates the set of superblock candidates when a bad-block-table of the NAND device is changed. These events generally coincide with bad block evaluation and thus impact superblock formation. Other such events can also be used to trigger the superblock candidate calculation.

The memory controller 115 is arranged to calculate a set of partial super block candidates. Here, a partial superblock candidate is a superblock candidate that has at least one plane (e.g., across all die) that has a bad block in the same position. Here, "same position" refers to the block's position within a plane, such as the third position in a plane. Thus, a traditional superblock cannot be formed due to the missing block from this position. In an example, the partial superblock calculate is performed when firmware is downloaded to the memory device 110, when a bad-block-table of the memory device 110 is changed, or any other bad block evaluation is performed.

In an example, partial super block candidates have a minimum number of planes with a good block in the same position. This restriction prevents undue performance impacts by superblocks that are too small. For example, in a four plane per die configuration, one and two plane superblocks are often too small, leading to excessive memory array access to perform read or write operations. In an example, the minimum number of planes is a percentage of available planes. In an example, the minimum number of planes is a minimum number of planes to establish a partial superblock of a predefined size. In an example, the minimum number of planes is three when there are four planes in a die of the NAND array.

The memory controller 115 is arranged to establish superblocks for the memory device 110 by using members of the set of superblock candidates after removing the set of partial superblock candidates from the set of superblock candidates. Thus, the superblock candidates that are not also in the partial superblock candidates can form traditional superblocks and are established as such.

The memory controller 115 is arranged to obtain (e.g., retrieve or receive a partial superblock use classification, and establish partial superblocks for classes of data according to the partial superblock use classification. The use classification is a data structure that defines a set of data classes that can use partial superblocks. In an example, the classes of data are at least one of user, OP, single level cache (SLC), logical-to-physical (L2P) mapping, first-level translation table, firmware, bad-block-table, replay-protect memory block (RPMB), or boot data. These different classes of data can rely on different attributes that makes them more or less suitable to be held on partial superblocks.

In an example, the partial superblock use classification includes a set of groups. Here, a member of the set of groups includes an allocation of partial superblocks to a set of the class of data. Thus, classes of data are grouped for example, based on similarities of impact when held on partial superblocks. The allocation specifies whether members of the group can be placed on partial superblocks, and to what extent they are placed on superblocks. For example, an allocation can specify that a group can use partial superblocks within a ration of superblocks, such as four superblocks to each partial superblock used to meet the group data requirements.

In an example, the set of groups are ordered. In an example, the partial superblock use classification specifies allocation of partial superblocks first to a group with a higher position in the order than to a group with a lower position in the order. For example, if a first group is higher in the hierarchy, it will be allocated partial superblocks before a group lower in the hierarchy. In an example, the higher ordered group is configured to decline the allocation. Thus, based on a configuration, partial superblocks will not be allocated to a higher ordered group, and can be allocated to a lower ordered group.

In an example, a group in the set of groups includes an allocation rule to allocate partial superblocks to store the first-level translation table, the firmware, and the bad-block-table classes of data. These classes of data generally use little storage space and can fit into partial superblocks. Thus, there is little to no performance penalty for using partial superblocks while freeing superblocks for other uses. In an example, a group in the set of groups allocates partial superblocks to store the user, the over provisioning the single level cache and the logical-to-physical mapping classes of data. In an example, a group in the set of groups allocates partial superblocks to store the RPMB, and the boot classes of data. In an example, a group in the set of groups includes a maximum ratio of partial superblocks to superblocks to allocate for a class of data. This last example addresses some performance issues with more demanding classes of data, such as user data, while still allowing use of partial superblocks. Here, a ration, such as three-to-one can be used to specify that an allocation to user data is at least three superblocks to every partial superblock. Thus performance impacts from excessive memory array 120 accesses are mitigated.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history or one or more error counts (e.g., a write operation error count a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 can include translation tables or a L2P mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
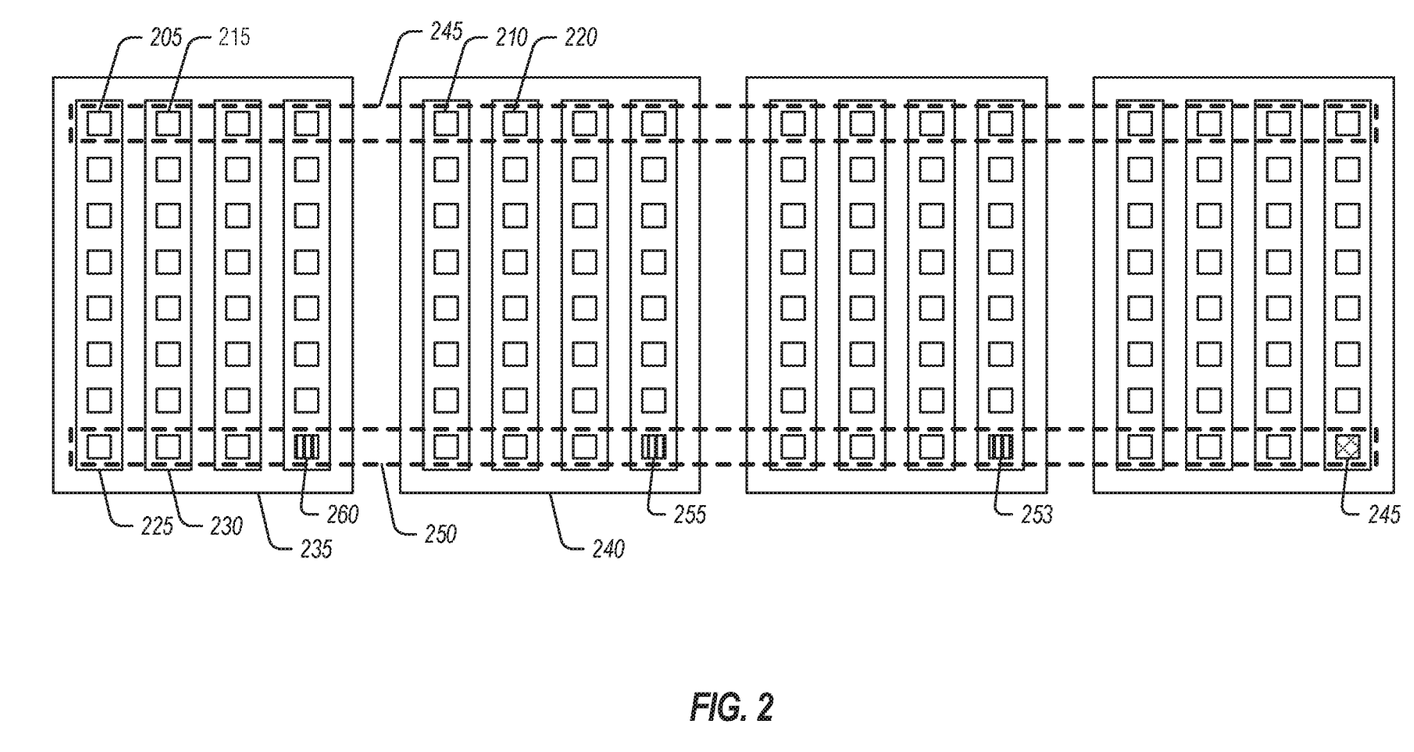
FIG. 2 illustrates an example of superblocks, according to an embodiment.

FIG. 2 illustrates an example of superblocks. The superblocks include the traditional superblock 245 and the defective candidate superblock 250. Superblock 245 spans all four planes of all four die, with a block in the same position (e.g., the first position) across the planes. For example, superblock 245 includes blocks 205 and 215 of planes 225 and 230 respectively in die 235 and die 240. The candidate superblock 250 differs from superblock 245 because it encompasses a bad block 245 in the fourth plane of the fourth die, preventing a traditional superblock from being formed. However by omitting blocks from the other fourth planes in the other die (e.g., block 253, block 255, and block 260), the candidate superblock 250 could be formed into a three-plane partial superblock. Alternatively, partial block 250 can also be formed by omitting bad block 245. In this example, a superblock will have four planes from three die plus one plane from one die.

Figure 3:
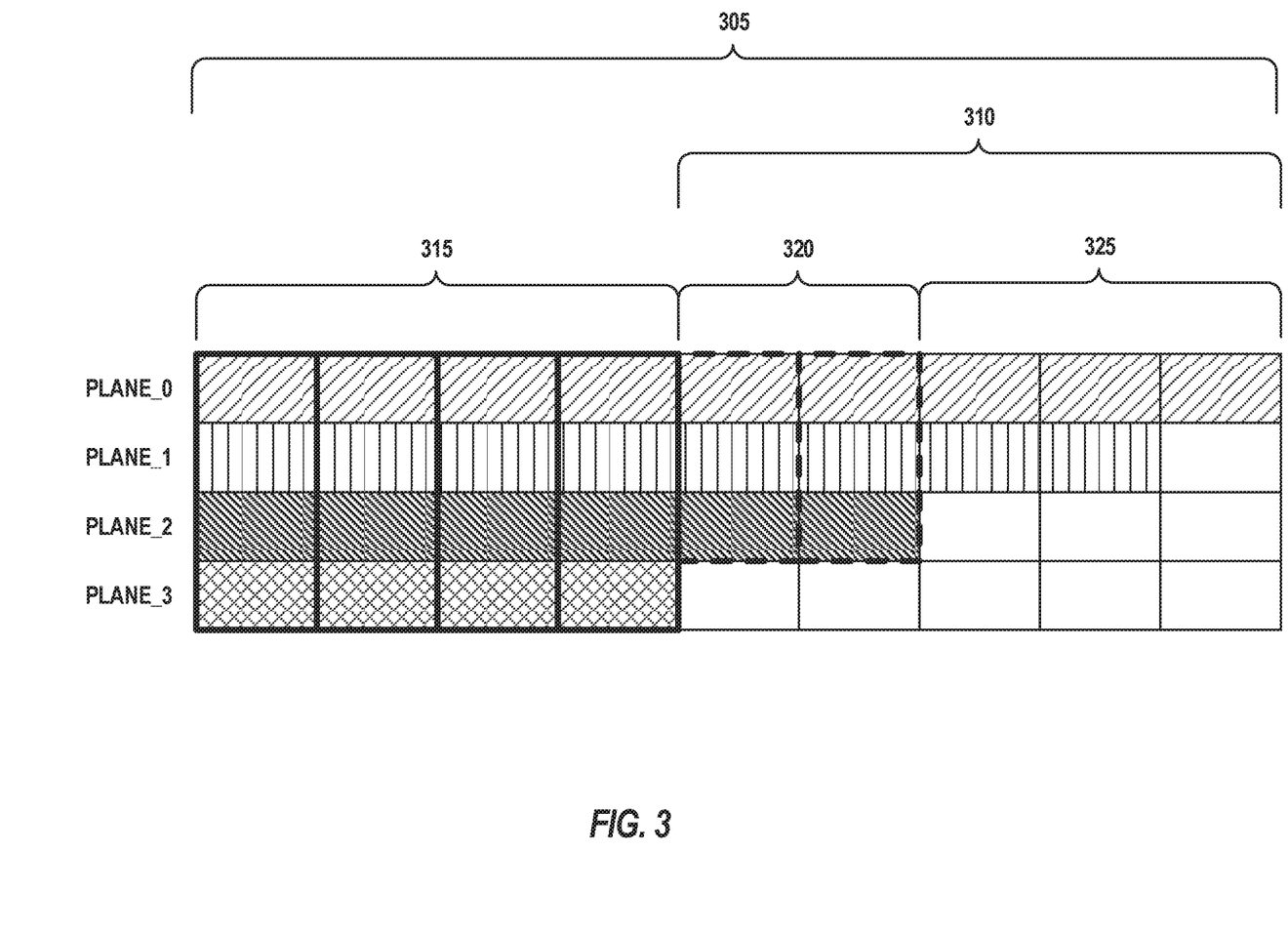
FIG. 3 illustrates an example of superblocks and partial superblocks, according to an embodiment.

FIG. 3 illustrates an example of superblocks and partial superblocks, according to an embodiment. As illustrated, good blocks within a plane have the same shading while bad blocks are unshaded. Because superblocks and partial superblocks span planes in a die, the columns represent candidate superblocks 305. The columns that include at least one bad block represent partial superblock candidates 310. The columns with no bad blocks can be formed into superblocks 315. Of the partial superblocks candidates, some candidates have too many bad blocks to be used effectively, and are discarded (e.g., unused) blocks 325. The remaining partial superblock candidates 310 are formed into partial superblocks 320. The heavy lines and heavily dashed lines spanning some of the planes (e.g., superblocks 315 and partial superblocks 320) illustrate individual superblock allocation across planes.

Figure 4:
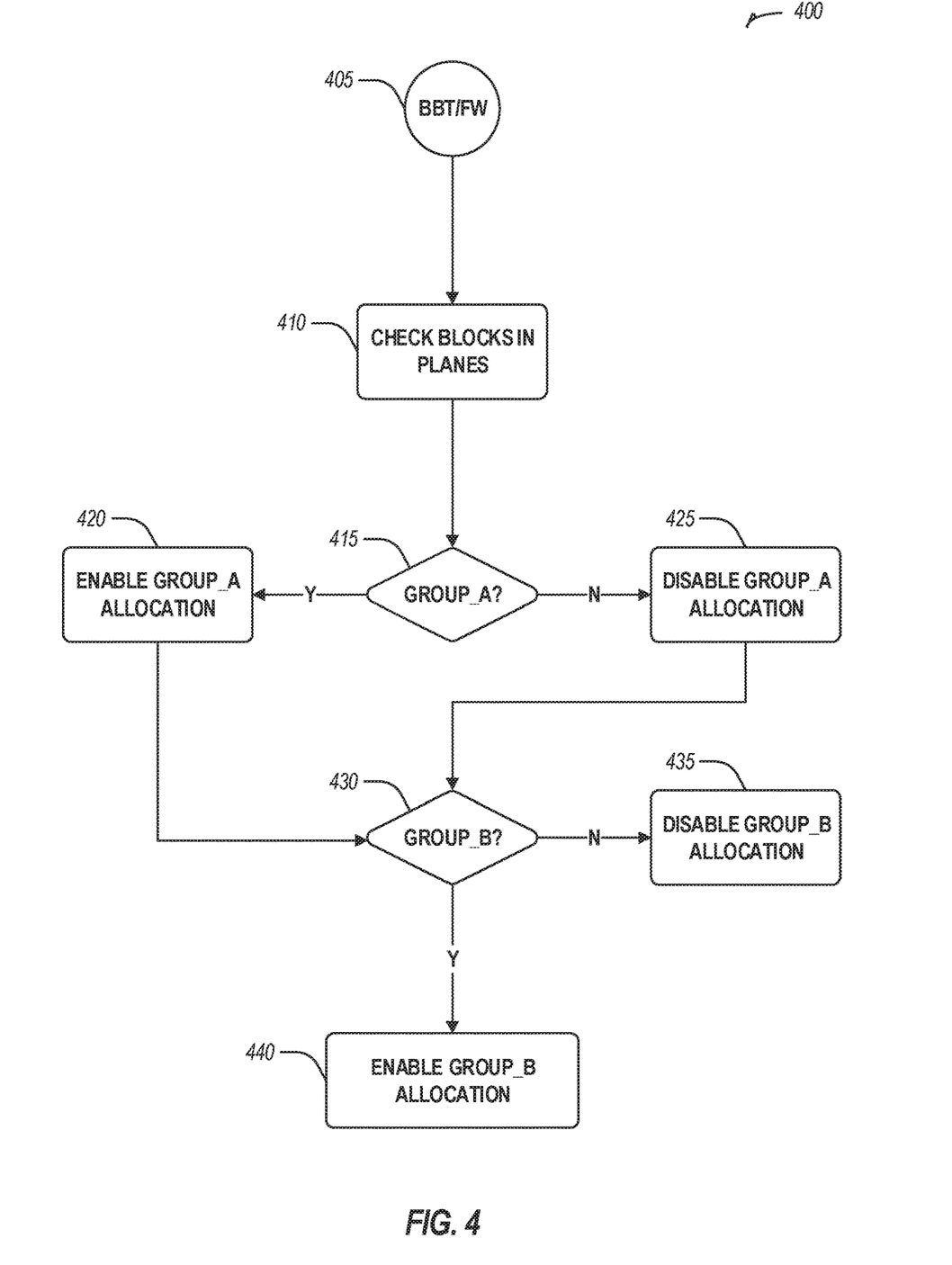
FIG. 4 illustrates a flowchart of a method of hierarchical use of partial superblocks for different classes of data according to an embodiment.

FIG. 4 illustrates a flowchart of a method 400 for hierarchical use of partial superblocks for different classes of data, according to an embodiment. The operations of the method 400 are carried out in electronic hardware, such as that described herein (e.g., circuitry). The following terms can be used to govern partial superblock allocations. GBPmin1 is a count of complete (e.g., four plane) superblocks 315. GBPmin2 is a count of four plane superblocks plus the number of three plane partial superblocks. This is a second test limit for the number of good block per plane (GBPmin1 being the first test limit). GBPmin2−GBPmin1=number of three plane super blocks.

The method 400 begins at an event 405 in which bad blocks are identified. Examples of the event 405 include bad block detection processes, BBT updates, firmware downloads, etc. Bad blocks in planes are then examined (operation 410) to form superblocks and partial superblocks. Data class groups are then evaluated to determine whether to allocate partial super blocks to satisfy storage needs of members of a data class group. For example, a configuration is checked to determine whether partial superblocks should be allocated to Group_A (decision 415). If yes, then partial superblocks are allocated to data classes in Group_A (operation 420). If no, then partial superblocks are not allocated to data classes in Group_A (operation 425). The configuration is again checked to determine whether data classes in Group_B should be allocated partial superblocks (decision 430). If yes, then partial superblocks are allocated to satisfy storage requirements for data classes in Group_B (operation 440); else, partial superblocks are not used for data classes in Group_B (operation 435). This flow can be readily extended in a similar manner to address additional data class groups in a hierarchical manner.

In an example, Group_A data classes represent data that has fewer performance related impacts due to the smaller size of a partial superblock. Thus, superblocks are used to satisfy user data, OP, SLC cache, and L2P data while partial superblocks (e.g., three-plane superblocks) are used for firmware code, BBT, and the first level translation table. Thus, here, user data+OP+SLC cache+L2P data equal GBPmin1. Impacts of Group_A allocation avoid performance degradation due to partial superblocks, assuming the system has the same OP and SLC cache.

Group_B includes data classes that are more sensitive to partial superblock performance issues, such as user data or OP. Thus, superblocks and partial superblocks are used for user data, OP, and SLC cache, while traditional superblocks are exclusively used for L2P data. Again, partial superblocks (e.g., three-plane superblocks) can be used for firmware code, BBT, and the first level table. GBPmin2 is the second test criteria to designate the number of three-plane superblocks to use in Group_B allocations.

Although Group_B allocations can result in small performance degradation, this effect could escape notice due to idle time of many devices, although greater firmware complexity in managing the partial superblocks and the data contained therein can result. In an example, for a given gigabyte of data, the number of three-plane superblocks can be restricted to one, and no other superblocks allowed, to minimize performance impacts. Group_B allocations can also result in increased L2P update complexity because the L2P table is modified to enable different block sizes.

Although not illustrated in FIG. 4, additional groups may be added in the partial superblock allocation hierarchy. For example, Group_C can include a specialized data class including RPMB or boot data. Here, superblocks can be allocated to user data, OP, SLC cache L2P data, and firmware data while partial superblocks are used to store RPMB or boot data blocks. Here, user data+OP+SLC cache+L2P data equal GBPmin1. Because user data is housed in superblocks, there is no performance impact noticeable by a user, however, additional data handling for boot and RPMB can ensue. Generally RPMB requirements are low (e.g., twenty megabytes per second for sequential eight-kilobyte writes, two-thousand input-output operations per second for random four-kilobyte writes, and two-thousand input-output operations per second for two hundred and fifty-six-byte random writes) and readily satisfied by three-plane superblocks.

Figure 5:
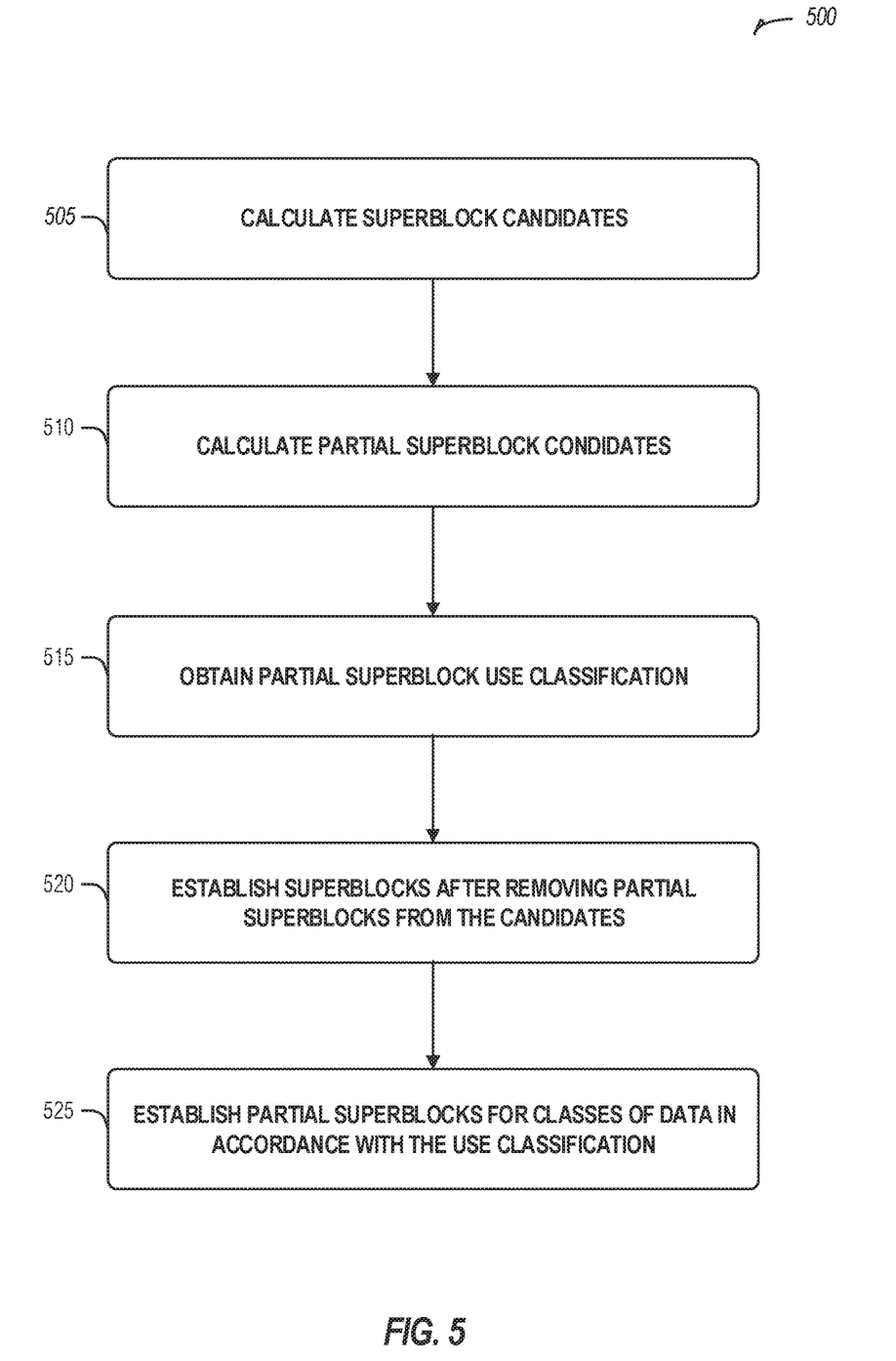
FIG. 5 illustrates a flowchart of a method for managing partial superblocks in a NAND device, according to an embodiment.

FIG. 5 illustrates a flowchart of a method 500 for managing partial superblocks in a NAND device, according to an embodiment. The operations of the method 500 are performed by electronic hardware, such as that described herein (e.g., circuitry).

At operation 505, a set of superblock candidates is calculated. Here, a superblock include a set of blocks that share a same position (e.g., the first position, second position, etc.) in each plane in each die of a NAND array of a NAND device. Further, each plane has at most one block from the set of blocks. In an example, the set of superblock candidate calculation is performed when firmware is downloaded to the NAND device. In an example, the set of superblock candidate calculation is performed when a bad-block-table of the NAND device is changed.

At operation 510, a set of partial super block candidates is calculated. Here, a partial superblock candidate is a superblock candidate that has at least one plane that has a bad block in the same position. In an example, the set of partial superblock candidate calculation is performed when firmware is downloaded to the NAND device. In an example, the set of partial superblock candidate calculation is performed when a bad-block-table of the NAND device is changed.

In an example, partial super block candidates have a minimum number of planes with a good block in the same position. In an example, the minimum number of planes is a percentage of available planes. In an example, the minimum number of planes is three when there are four planes in a die of the NAND array.

At operation 515, a partial superblock use classification is obtained.

At operation 520, superblocks are established for the NAND device by using members of the set of superblock candidates that are not in the set of partial superblock candidates.

At operation 525, partial superblocks are established for classes of data in the NAND device according to the partial superblock use classification. In an example, the classes of data are at least one of user data, OP, SLC cache, L2P data, first-level table, firmware, BBT, RPMB, or boot data.

In an example, the partial superblock use classification includes a set of groups. Here, a member of the set of groups includes an allocation of partial superblocks to a set of the class of data. In an example, the set of groups are ordered. In an example the partial superblock use classification specifies allocation of partial superblocks first to a group with a higher position in the order than to a group with a lower position in the order.

In an example, a group in the set of groups allocates partial superblocks to store the first-level table, the firmware, and the BBT classes of data. In an example, a group in the set of groups allocates partial superblocks to store the user data, the OP, the SLC cache, and the L2P classes of data. In an example, a group in the set of groups allocates partial superblocks to store the RPMB and the boot classes of data. In an example, a group in the set of groups includes a maximum ratio of partial superblocks to superblocks to allocate for a class of data.

Figure 6:
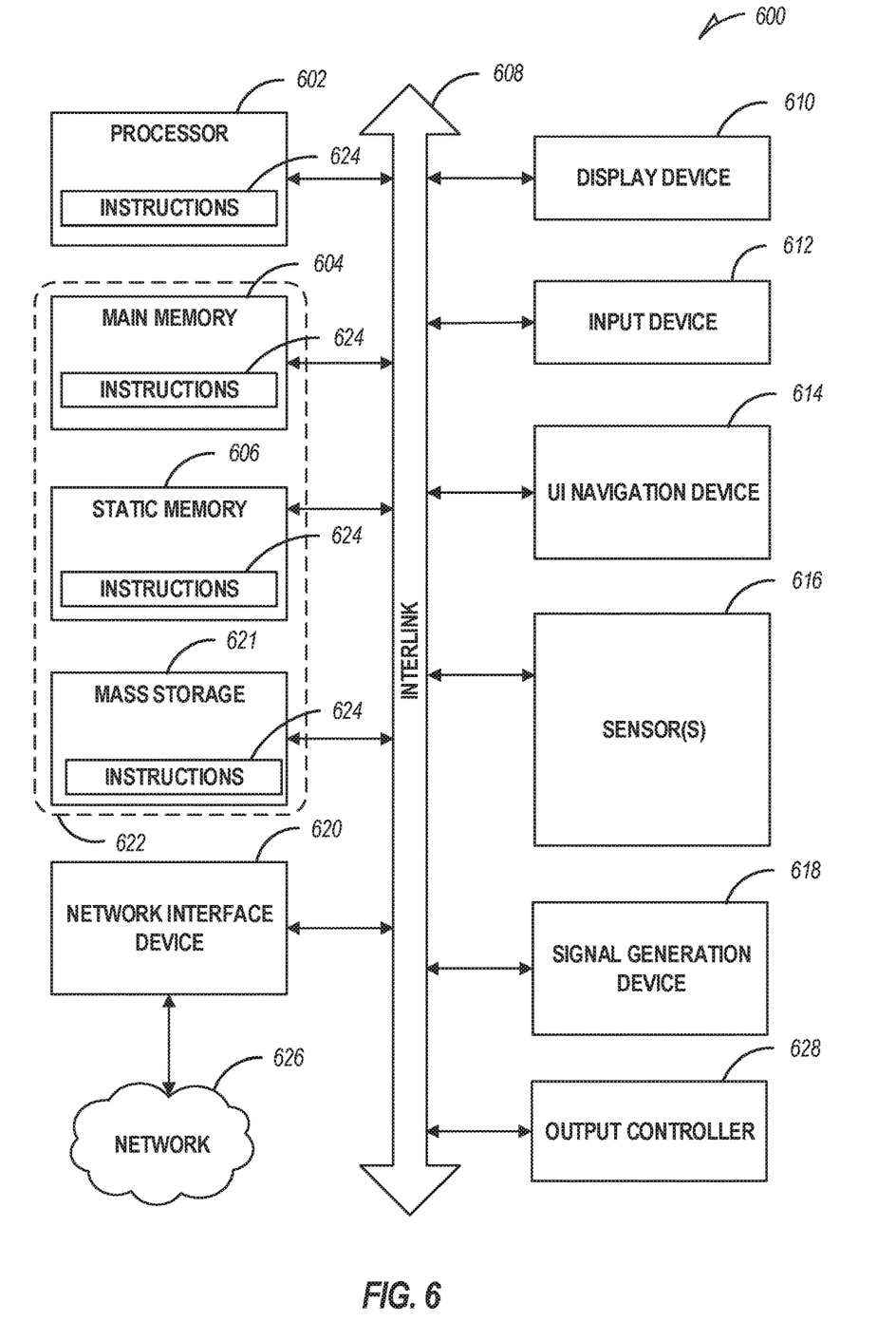
FIG. 6 is a block diagram illustrating an example of a machine upon which one or more embodiments can be implemented.

FIG. 6 illustrates a block diagram of an example machine 600 upon which any one or more of the techniques (e.g., methodologies) discussed herein can perform. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 600 (e.g., the host device 105, the memory device 110 etc.) can include a hardware processor 602 (e.g., a central processing unit (CPU), a graphics processing unit (GPU), a hardware processor core, or any combination thereof, such as the memory controller 115, etc.), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 616, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute the machine readable medium 622.

While the machine readable medium 622 is illustrated as a single medium, the term "machine readable medium" can include a single medium or multiple media (e.g., a centralized or distributed database, and/or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data are stored on the storage device 621, can be accessed by the memory 604 for use by the processor 602. The memory 604 (e.g., DRAM) is typically fast, but volatile, and thus a different type of storage than the storage device 621 (e.g., an SSD), which is suitable for long-term storage, including while in an "off" condition. The instructions 624 or data in use by a user or the machine 600 are typically loaded in the memory 604 for use by the processor 602. When the memory 604 is full, virtual space from the storage device 621 can be allocated to supplement the memory 604; however, because the storage 621 device is typically slower than the memory 604, and write speeds are typically at least twice as slow as read speeds, use of virtual memory can greatly reduce user experience due to storage device latency (in contrast to the memory 604, e.g., DRAM). Further, use of the storage device 621 for virtual memory can greatly reduce the usable lifespan of the storage device 621.

In contrast to virtual memory, virtual memory compression (e.g., the Linux® kernel feature "ZRAM") uses part of the memory as compressed block storage to avoid paging to the storage device 621. Paging takes place in the compressed block until it is necessary to write such data to the storage device 621. Virtual memory compression increases the usable size of memory 604, while reducing wear on the storage device 621.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMS?), multiple-input multiple-output (MIM©), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL EXAMPLES

Example 1 is a NAND device for managing partial superblocks, the NAND device comprising: a NAND array; and a controller arranged to: calculate a set of superblock candidates, a superblock comprising a set of blocks that share a same position in each plane in each die of the NAND array, each plane having at most one block from the set of blocks; calculate a set of partial super block candidates a partial superblock candidate being a superblock candidate that has at least one plane that has a bad block; obtain a partial superblock use classification; establish superblocks for the NAND device by using members of the set of superblock candidates the set of partial superblock candidates are removed from the set of superblock candidates; and establish partial superblocks for classes of data in the NAND device according to the partial superblock use classification.

In Example 2, the subject matter of Example 1 includes, wherein partial super block candidates have a minimum number of planes with a good block in the same position.

In Example 3, the subject matter of Example 2 includes, wherein the minimum number of planes is a percentage of available planes.

In Example 4, the subject matter of Examples 2-3 includes, wherein the minimum number of planes is three when there are four planes in a die of the NAND array.

In Example 5, the subject matter of Examples 1-4 includes, wherein the classes of data are at least one of user, over provisioning, single level cache, logical-to-physical mapping, first-level translation table, firmware, bad-block-table, replay-protect memory block, or boot data.

In Example 6, the subject matter of Examples 1-5 includes, wherein the partial superblock use classification includes a set of groups a member of the set of groups including an allocation of partial superblocks to a set of the class of data.

In Example 7, the subject matter of Example 6 includes, wherein a group in the set of groups allocates partial superblocks to store the first-level translation table, the firmware, and the bad-block-table classes of data.

In Example 8, the subject matter of Examples 6-7 includes, wherein a group in the set of groups allocates partial superblocks to store the user, the over provisioning, the single level cache, and the logical-to-physical mapping classes of data.

In Example 9, the subject matter of Examples 6-8 includes, wherein a group in the set of groups allocates partial superblocks to store the replay-protect memory block, and the boot classes of data.

In Example 10, the subject matter of Examples 6-9 includes, wherein a group in the set of groups includes a maximum ratio of partial superblocks to superblocks to allocate for a class of data.

In Example 11, the subject matter of Examples 6-10 includes, wherein the set of groups are ordered, and wherein the partial superblock use classification specifies allocation of partial superblocks first to a group with a higher position in the order than to a group with a lower position in the order.

In Example 12, the subject matter of Examples 1-11 includes, wherein the controller is arranged to calculate calculating the set of superblock candidates and calculate the set of partial superblock candidates in response to a download of firmware to the NAND device.

In Example 13, the subject matter of Examples 1-12 includes, wherein the controller is arranged to calculate calculating the set of superblock candidates and calculate the set of partial superblock candidates in response to a change in a bad-block-table of the NAND device.

Example 14 is a method for managing partial superblocks in a NAND device, the method comprising: calculating a set of superblock candidates, a superblock comprising a set of blocks that share a same position in each plane in each die of a NAND array of the NAND device, each plane having at most one block from the set of blocks; calculating a set of partial super block candidates, a partial superblock candidate being a superblock candidate that has at least one plane that has a bad block; obtaining a partial superblock use classification; establishing superblocks for the NAND device by using members of the set of superblock candidates after removing the set of partial superblock candidates from the set of superblock candidates; and establishing partial superblocks for classes of data in the NAND device according to the partial superblock use classification.

In Example 15, the subject matter of Example 14 includes, wherein partial super block candidates have a minimum number of planes with a good block in the same position.

In Example 16, the subject matter of Example 15 includes, wherein the minimum number of planes is a percentage of available planes.

In Example 17, the subject matter of Examples 15-16 includes, wherein the minimum number of planes is three when there are four planes in a die of the NAND array.

In Example 18, the subject matter of Examples 14-17 includes, wherein the classes of data are at least one of user, over provisioning, single level cache, logical-to-physical mapping, first-level translation table, firmware, bad-block-table, replay-protect memory block, or boot data.

In Example 19, the subject matter of Examples 14-18 includes, wherein the partial superblock use classification includes a set of groups, a member of the set of groups including an allocation of partial superblocks to a set of the class of data.

In Example 20, the subject matter of Example 19 includes, wherein a group in the set of groups allocates partial superblocks to store the first-level translation table, the firmware, and the bad-block-table classes of data.

In Example 21, the subject matter of Examples 19-20 includes, wherein a group in the set of groups allocates partial superblocks to store the user, the over provisioning, the single level cache, and the logical-to-physical mapping classes of data.

In Example 22, the subject matter of Examples 19-21 includes, wherein a group in the set of groups allocates partial superblocks to store the replay-protect memory block, and the boot classes of data.

In Example 23, the subject matter of Examples 19-22 includes, wherein a group in the set of groups includes a maximum ratio of partial superblocks to superblocks to allocate for a class of data.

In Example 24, the subject matter of Examples 19-23 includes, wherein the set of groups are ordered and wherein the partial superblock use classification specifies allocation of partial superblocks first to a group with a higher position in the order than to a group with a lower position in the order.

In Example 25, the subject matter of Examples 14-24 includes, wherein calculating the set of superblock candidates and calculating the set of partial superblock candidates is performed when firmware is downloaded to the NAND device.

In Example 26, the subject matter of Examples 14-25 includes, wherein calculating the set of superblock candidates and calculating the set of partial superblock candidates is performed when a bad-block-table of the NAND device is changed.

Example 27 is at least one machine readable medium including instructions that, when executed by processing circuitry, cause the processing circuitry to perform any method of Examples 14-26.

Example 28 is a system comprising means to perform any method of Examples 14-26.

Example 29 is at least one machine readable medium including instructions for managing partial superblocks in a NAND device, the instructions, when executed by processing circuitry, cause the processing circuitry to perform operations comprising: calculating a set of superblock candidates, a superblock comprising a set of blocks that share a same position in each plane in each die of a NAND array of the NAND device, each plane having at most one block from the set of blocks; calculating a set of partial super block candidates, a partial superblock candidate being a superblock candidate that has at least one plane that has a bad block; obtaining a partial superblock use classification; establishing superblocks for the NAND device by using members of the set of superblock candidates after removing the set of partial superblock candidates from the set of superblock candidates; and establishing partial superblocks for classes of data in the NAND device according to the partial superblock use classification.

In Example 30, the subject matter of Example 29 includes, wherein partial super block candidates have a minimum number of planes with a good block in the same position.

In Example 31, the subject matter of Example 30 includes, wherein the minimum number of planes is a percentage of available planes.

In Example 32, the subject matter of Examples 30-31 includes, wherein the minimum number of planes is three when there are four planes in a die of the NAND array.

In Example 33, the subject matter of Examples 29-32 includes, wherein the classes of data are at least one of user over provisioning single level cache logical-to-physical mapping, first-level translation table, firmware, bad-block-table, replay-protect memory block, or boot data.

In Example 34, the subject matter of Examples 29-33 includes, wherein the partial superblock use classification includes a set of groups, a member of the set of groups including an allocation of partial superblocks to a set of the class of data.

In Example 35, the subject matter of Example 34 includes, wherein a group in the set of groups allocates partial superblocks to store the first-level translation table, the firmware, and the bad-block-table classes of data.

In Example 36, the subject matter of Examples 34-35 includes, wherein a group in the set of groups allocates partial superblocks to store the user, the over provisioning, the single level cache, and the logical-to-physical mapping classes of data.

In Example 37, the subject matter of Examples 34-36 includes, wherein a group in the set of groups allocates partial superblocks to store the replay-protect memory block, and the boot classes of data.

In Example 38, the subject matter of Examples 34-37 includes, wherein a group in the set of groups includes a maximum ratio of partial superblocks to superblocks to allocate for a class of data.

In Example 39, the subject matter of Examples 34-38 includes, wherein the set of groups are ordered and wherein the partial superblock use classification specifies allocation of partial superblocks first to a group with a higher position in the order than to a group with a lower position in the order.

In Example 40, the subject matter of Examples 29-39 includes, wherein calculating the set of superblock candidates and calculating the set of partial superblock candidates is performed when firmware is downloaded to the NAND device.

In Example 41, the subject matter of Examples 29-40 includes, wherein calculating the set of superblock candidates and calculating the set of partial superblock candidates is performed when a bad-block-table of the NAND device is changed.

Example 42 is a system for managing partial superblocks in a NAND device, the system comprising: means for calculating a set of superblock candidates, a superblock comprising a set of blocks that share a same position in each plane in each die of a NAND array of the NAND device, each plane having at most one block from the set of blocks; means for calculating a set of partial super block candidates, a partial superblock candidate being a superblock candidate that has at least one plane that has a bad block; means for obtaining a partial superblock use classification; means for establishing superblocks for the NAND device by using members of the set of superblock candidates after removing the set of partial superblock candidates from the set of superblock candidates; and means for establishing partial superblocks for classes of data in the NAND device according to the partial superblock use classification.

In Example 43, the subject matter of Example 42 includes, wherein partial super block candidates have a minimum number of planes with a good block in the same position.

In Example 44, the subject matter of Example 43 includes, wherein the minimum number of planes is a percentage of available planes.

In Example 45, the subject matter of Examples 43-44 includes, wherein the minimum number of planes is three when there are four planes in a die of the NAND array.

In Example 46, the subject matter of Examples 42-45 includes, wherein the classes of data are at least one of user, over provisioning, single level cache, logical-to-physical mapping, first-level translation table, firmware, bad-block-table, replay-protect memory block, or boot data.

In Example 47, the subject matter of Examples 42-46 includes, wherein the partial superblock use classification includes a set of groups, a member of the set of groups including an allocation of partial superblocks to a set of the class of data.

In Example 48, the subject matter of Example 47 includes, wherein a group in the set of groups allocates partial superblocks to store the first-level translation table, the firmware, and the bad-block-table classes of data.

In Example 49, the subject matter of Examples 47-48 includes, wherein a group in the set of groups allocates partial superblocks to store the user, the over provisioning, the single level cache, and the logical-to-physical mapping classes of data.

In Example 50, the subject matter of Examples 47-49 includes, wherein a group in the set of groups allocates partial superblocks to store the replay-protect memory block, and the boot classes of data.

In Example 51, the subject matter of Examples 47-50 includes, wherein a group in the set of groups includes a maximum ratio of partial superblocks to superblocks to allocate for a class of data.

In Example 52, the subject matter of Examples 47-51 includes, wherein the set of groups are ordered, and wherein the partial superblock use classification specifies allocation of partial superblocks first to a group with a higher position in the order than to a group with a lower position in the order.

In Example 53, the subject matter of Examples 42-52 includes, wherein the means for calculating the set of superblock candidates and the means for calculating the set of partial superblock candidates are arranged to operate is response to firmware being downloaded to the NAND device.

In Example 54, the subject matter of Examples 42-53 includes, wherein the means for calculating the set of superblock candidates and the means for calculating the set of partial superblock candidates are arranged to operate is response to a changing in a bad-block-table of the NAND.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include but are not limited to, hard disks, removable magnetic disks removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory device for managing partial superblocks, the memory device comprising:
    a memory including instructions; and
    a controller, when in operation, configured by the instructions to:
        calculate a set of superblock candidates to create a pool of superblocks, a superblock comprising a set of storage locations across storage devices of the memory device, each storage device having one corresponding storage location, wherein storage locations are complete blocks;
        calculate a set of partial superblock candidates to create a pool of partial superblocks, a partial superblock candidate being a superblock candidate that has at least one inoperative storage location;
        remove the pool of partial superblocks from the pool of superblocks; and
        store data classified as management data, in accordance with a group ordering of management data group classification, in a partial superblock from the pool of partial superblocks.

2. The memory device of claim 1, wherein the partial superblocks have a threshold number of operative storage locations.

3. The memory device of claim 2, wherein the threshold number of operative storage locations is a percentage of all storage locations in the partial superblock.

4. The memory device of claim 2, wherein the threshold number of operative storage locations is three when there are four total storage locations in the partial superblock.

5. The memory device of claim 1, wherein data is classified as management data or user data, and wherein the management data includes at least one of over provisioning, single level cache, logical-to-physical mapping, first-level translation table, firmware, bad-block-table, replay-protect memory block, or boot data.

6. The memory device of claim 1, wherein the controller is configured to calculate the set of superblock candidates and the set of partial superblock candidates in response to receipt of a firmware update by the memory device.

7. The memory device of claim 1, wherein the controller is configured to calculate the set of superblock candidates and the set of partial superblock candidates in response to a change in a bad-block-table of the memory device.

8. A method for managing partial superblocks, the method performed by a memory device, the method comprising:
    calculating a set of superblock candidates to create a pool of superblocks, a superblock comprising a set of storage locations across storage devices of the memory device, each storage device having one corresponding storage location, wherein storage locations are complete blocks;
    calculating a set of partial superblock candidates to create a pool of partial superblocks, a partial superblock candidate being a superblock candidate that has at least one inoperative storage location;
    removing the pool of partial superblocks from the pool of superblocks; and
    storing data classified as management data, in accordance with a group ordering of management data group classification, in a partial superblock from the pool of partial superblocks.

9. The method of claim 8, wherein the partial superblocks have a threshold number of operative storage locations.

10. The method of claim 9, wherein the threshold number of operative storage locations is a percentage of all storage locations in the partial superblock.

11. The method of claim 9, wherein the threshold number of operative storage locations is three when there are four total storage locations in the partial superblock.

12. The method of claim 8, wherein data is classified as management data or user data, and wherein the management data includes at least one of over provisioning, single level cache, logical-to-physical mapping, first-level translation table, firmware, bad-block-table, replay-protect memory block, or boot data.

13. The method of claim 8, wherein the set of superblock candidates and the set of partial superblock candidates are calculated in response to receipt of a firmware update by the memory device.

14. The method of claim 8, wherein the set of superblock candidates and the set of partial superblock candidates are calculated in response to a change in a bad-block-table of the memory device.

15. A non-transitory machine-readable medium including instructions for managing partial superblocks in a memory device, the instructions, when executed by circuitry, cause the circuitry to perform operations comprising:
    calculating a set of superblock candidates to create a pool of superblocks, a superblock comprising a set of storage locations across storage devices of the memory device, each storage device having one corresponding storage location, wherein storage locations are complete blocks;
    calculating a set of partial superblock candidates to create a pool of partial superblocks, a partial superblock candidate being a superblock candidate that has at least one inoperative storage location;
    removing the pool of partial superblocks from the pool of superblocks; and
    storing data classified as management data, in accordance with a group ordering of management data group classification, in a partial superblock from the pool of partial superblocks.

16. The machine-readable medium of claim 15, wherein the partial superblocks have a threshold number of operative storage locations.

17. The machine-readable medium of claim 16, wherein the threshold number of operative storage locations is a percentage of all storage locations in the partial superblock.

18. The machine-readable medium of claim 16, wherein the threshold number of operative storage locations is three when there are four total storage locations in the partial superblock.

19. The machine-readable medium of claim 15, wherein data is classified as management data or user data, and wherein the management data includes at least one of over provisioning, single level cache, logical-to-physical mapping, first-level translation table, firmware, bad-block-table, replay-protect memory block, or boot data.

20. The machine-readable medium of claim 15, wherein the set of superblock candidates and the set of partial superblock candidates are calculated in response to receipt of a firmware update by the memory device.

21. The machine-readable medium of claim 15, wherein the set of superblock candidates and the set of partial superblock candidates are calculated in response to a change in a bad-block-table of the memory device.

* * * * *